(12) United States Patent
Nakada et al.

(10) Patent No.: US 7,299,976 B2
(45) Date of Patent: Nov. 27, 2007

(54) PAYMENT APPARATUS AND METHOD, AND MONEY ASSIGNMENT APPARATUS AND METHOD

(75) Inventors: Yohei Nakada, Yokohama (JP); Katsuya Yokomura, Yokohama (JP); Toshiyuki Morita, Yokohama (JP); Kunihiro Nomura, Nagoya (JP); Kenji Uematsu, Tokyo (JP); Shigeyuki Sekiguchi, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 686 days.

(21) Appl. No.: 10/704,133

(22) Filed: Nov. 10, 2003

(65) Prior Publication Data
US 2004/0199465 A1    Oct. 7, 2004

(30) Foreign Application Priority Data
Mar. 20, 2003    (JP) .............................. 2003-077556

(51) Int. Cl.
    *G07F 19/00*    (2006.01)
(52) U.S. Cl. ...................... 235/379; 235/375; 235/380
(58) Field of Classification Search ................ 235/379, 235/380, 375
    See application file for complete search history.

(56) References Cited

U.S. PATENT DOCUMENTS

2003/0024979 A1*    2/2003    Hansen et al. .............. 235/379

FOREIGN PATENT DOCUMENTS

EP    1 081 628 A1    3/2001

\* cited by examiner

*Primary Examiner*—Karl D. Frech
(74) *Attorney, Agent, or Firm*—McDermott Will & Emery LLP

(57) ABSTRACT

A payment apparatus according to the present invention comprises an input unit to enter transaction information containing a transaction amount, a storage device to store payment method information containing a usage restriction for each of the payment method, a payment method information extracting apparatus to extract payment method information from the storage device by using the transaction information received from the input unit and selects a payment method to execute the payment according to the payment method information extracted, and a payment execution module to execute, by using the transaction information received from the payment method information extracting apparatus, the payment according to the payment method selected

28 Claims, 11 Drawing Sheets

FIG. 3

| | | | | TRANSACTION ATTRIBUTE INFORMATION | | |
|---|---|---|---|---|---|---|
| TRANS-ACTION AMOUNT | CUSTOMER IDENTIFI-CATION INFORMATION | COMMODITY IDENTIFI-CATION INFORMATION | SHOP IDEN-TIFICATION INFORMATION | SEX OF CUSTOMER | COMMOD-ITY NAME | SHOP ADDRESS |
| 11000 | CUSTOMER A | COMMODITY TYPE A | SHOP A | MALE | ... | ... |
| 310 | 320 | 330 | 340 | 360 | 370 | 380 |

300 — TRANSACTION INFORMATION
350 — TRANSACTION ATTRIBUTE INFORMATION

FIG. 5

| | 510 | 520 | | 500 |
|---|---|---|---|---|
| | PAYMENT INFORMATION | | | |
| | PAYMENT METHOD IDENTIFICATION INFORMATION | PAYMENT AMOUNT | . . . | . . . |
| | PAYMENT EXECUTION MODULE 1 | 10000 | . . . | . . . |
| | PAYMENT EXECUTION MODULE 3 | 1000 | . . . | . . . |
| | . . . | . . . | . . . | . . . |
| | . . . | . . . | . . . | . . . |

FIG. 7
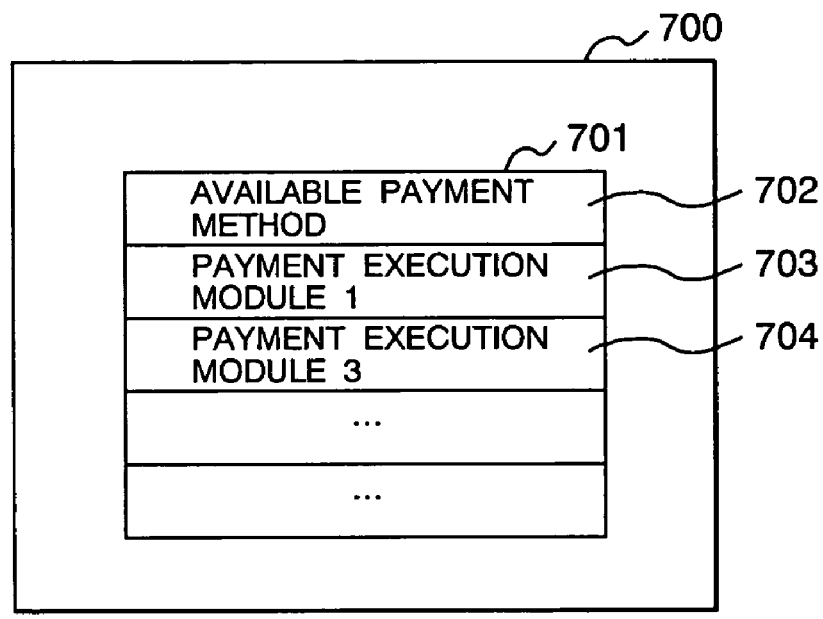
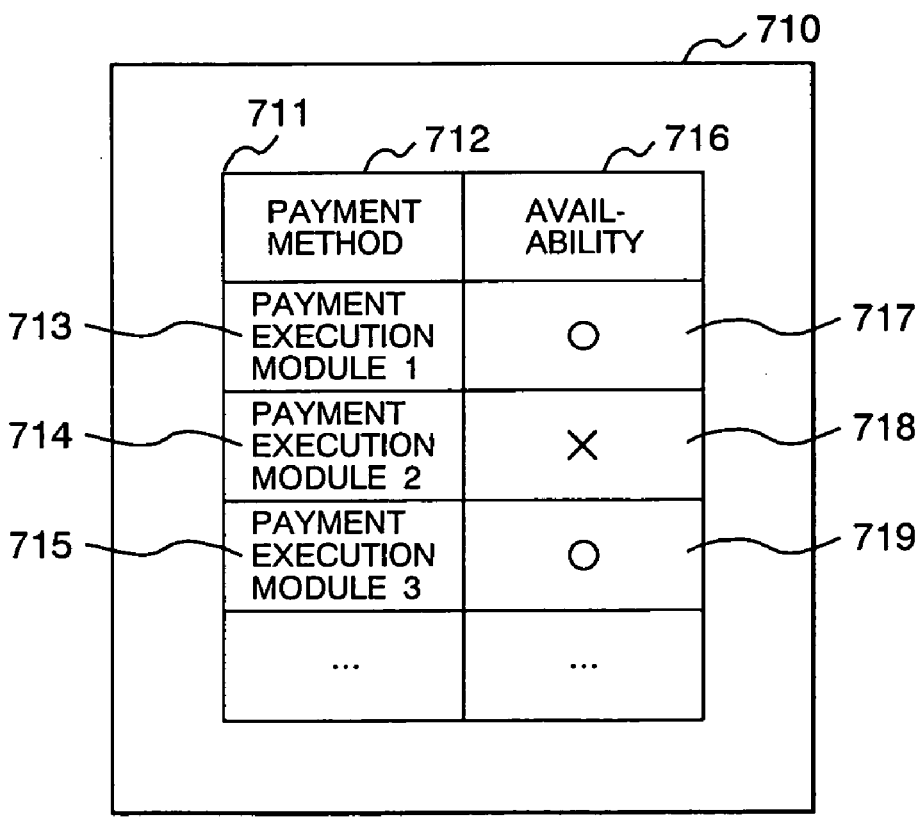

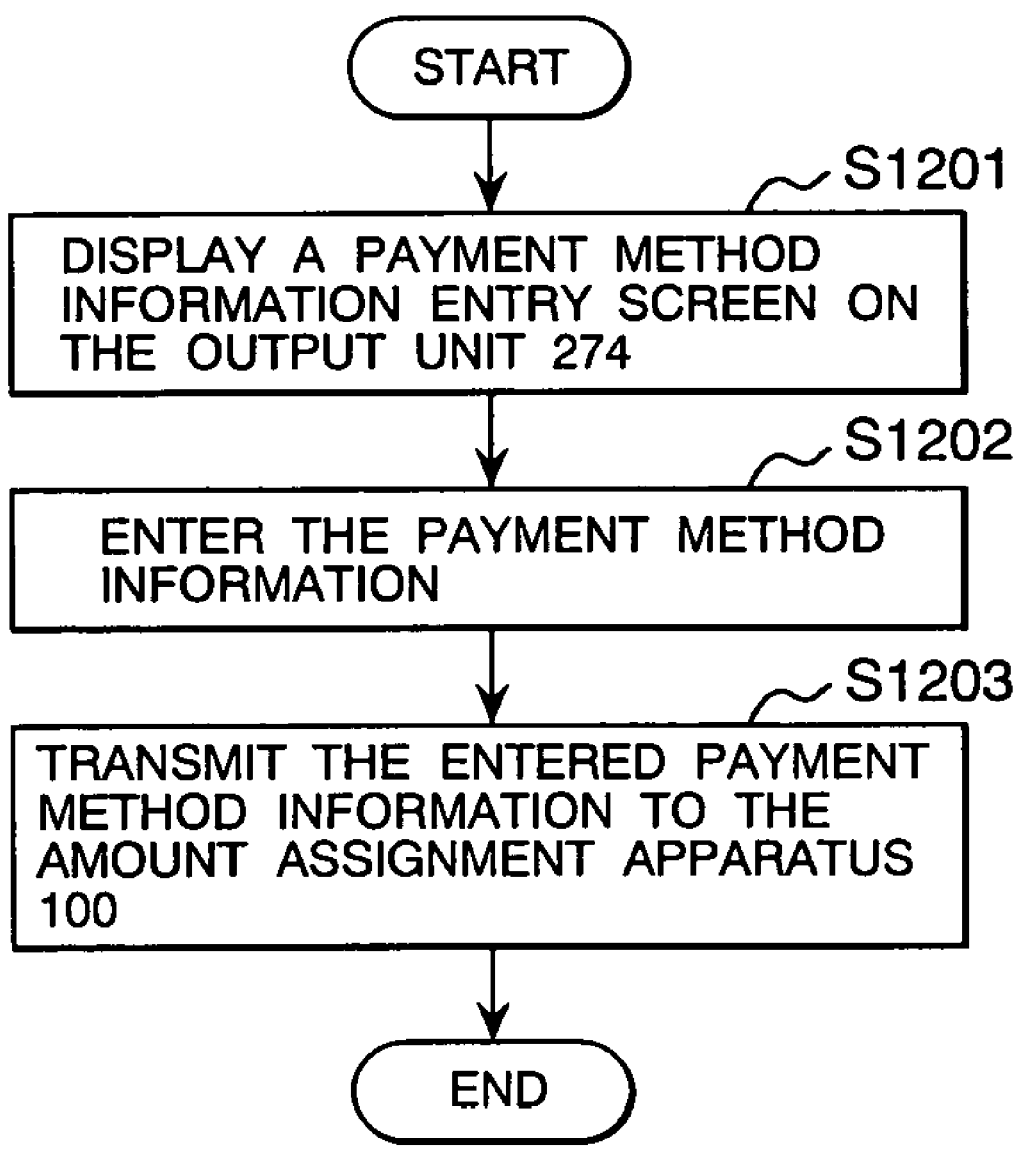

PAYMENT APPARATUS AND METHOD, AND MONEY ASSIGNMENT APPARATUS AND METHOD

BACKGROUND OF THE INVENTION

The present invention relates to an apparatus and a method which automatically assigns transaction amount according to the payment method to be used by customers, and also relates to a payment apparatus and a payment method that use such automatic assignment apparatus.

EP-A-1081628 (JP-A-11-259588) as a prior art discloses a payment system in which a payment means to be used for the payment of transaction amount is chosen among many payment means such as a debit card and a credit card. The object of EP-A-1081628 is to enable depositing and withdrawing of money from a bank account that is most advantageous to a customer out of a plurality of bank accounts coupled with each other. EP-A-1081628 discloses: means for managing account information which manages a plurality of information on accounts opened by a customer for a plurality of banking facility processing apparatuses; means for setting priority which determines the priority for a plurality of accounts; means for selecting transaction account, upon receiving a transaction request, which selects an account with highest priority among a plurality of accounts as the transaction account; and means for manipulating money information which executes operations according to a transaction request on the money information of the above-stated transaction account selected by the transaction account selection means.

Some payment methods are provided with usage restrictions on shops, commodities and amounts. For example, some payment methods to use credit cards are provided with usage restrictions called the maximum credit amount regarding the upper limit of payment amount. Such point-winning payment methods that are managed by mass retailers of electrical equipment are only be usable for transactions at shops that are operated by the point-issuing companies. Payment methods to use local money can only be used for transactions at shops located in specified areas. Some payment methods to use cash vouchers include those that can only be used for transactions at shops specified at the back of the vouchers, or those that can only be used for transaction of specified commodities such as books, stationeries and liquors.

The payment methods to use cash vouchers include those that have usage restrictions on payment amount wherein the vouchers are only usable for transactions in a certain limited unit of money. For example, a payment method based on the payment unit of 1,000 yen exists, wherein, for purchasing a 1,200-yen commodity, a voucher can be use for the portion of 1,000 yen, but the voucher is not usable for the remaining 200 yen, and the remaining 200 yen must be settled by other payment methods.

According to EP-A-1081628, it is possible to select a payment method to be used for the payment by suing the priority that is defined before the transaction is executed. However, with EP-A-1081628, since the selection of payment method is executed without considering information on a transaction and the usage restriction on a payment method, there may be a possibility to select a payment method that cannot be used for a transaction executed.

SUMMARY OF THE INVENTION

An object of the present invention is to provide an apparatus and a method that enables payment through a payment apparatus that is suitable to a customer by considering information on a transaction and the usage restriction of a payment apparatus and automatically assigning the transaction amount to the payment apparatus.

In order to achieve the above-stated object, the present invention offers an arrangement to refer to a usage restriction for each payment method and select a payment method with which the transaction amount should be settled.

According to an aspect of the present invention, transaction information containing a transaction amount is entered; payment method information containing information related to usage restrictions for each payment method is extracted from a storage device by using the above-stated transaction information; a payment method to execute the payment is selected based on such extracted payment method information; and the payment is executed in the payment method selected by using the transaction information.

Further, according to another aspect of the present invention, transaction information containing a transaction amount is entered; payment method information containing information related to usage restrictions for each payment method is extracted from a storage device by using the above-stated transaction information; payment amount to be paid for each of the above-stated payment methods is calculated by using the extracted payment information and the transaction information; payment information containing the calculated payment amount is generated; and the payment is executed according to the payment method by using the payment information.

Here, the payment method implies payment methods by a credit card, a debit card, installments, electronic money, a gift certificate, points, and a discount coupon.

According to the above-stated present invention, a payment is enabled in a payment method which is suitable to a customer by considering usage restrictions for transaction information and payment methods and picking out an available payment method, and also by automatically assigning the transaction amount to the available payment method. Thus, the burden of a customer can be released.

BRIEF DESCRIPTION OF THE DRAWING

FIG. 3 is a diagram showing a structural example of transaction information according to the embodiment of the present invention;

FIG. 5 is a diagram showing a structural example of payment information according to the embodiment of the present invention;

FIG. 7 is a diagram showing an example of a display screen of payment method information according to the embodiment of the present invention;

FIG. 12 is a flow chart showing an example of processing executed by a payment method information registration apparatus according to the embodiment of the present invention.

DETAILED DESCRIPTION OF THE PREFERRED EMBODIMENTS OF THE INVENTION

Figure 1:
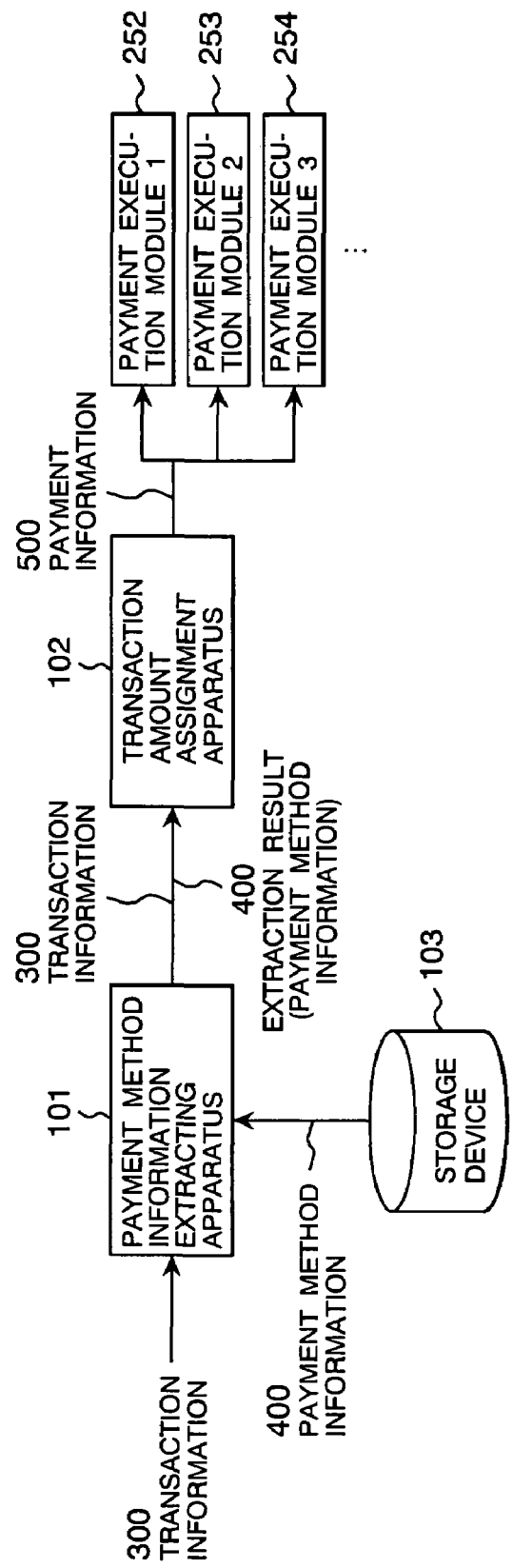
FIG. 1 is a diagram showing a basic configuration of a system according to the present invention.

FIG. 1 shows an example of a basic configuration of a system used in the present invention. As shown in FIG. 1, an example of the basic system configuration used in the present invention comprises a payment method information extracting apparatus 101, a transaction amount assignment apparatus 102, a storage device 103, and a plurality of payment execution modules 252, 253 and 254.

The payment method information extracting apparatus 101 receives transaction information 300 containing a transaction amount, extracts payment method information 400 from the storage device 103 based on transaction information 300, and delivers the transaction information 300 and the payment method information 400 to the transaction amount assignment apparatus 102.

The transaction amount assignment apparatus 102 calculates the payment amount of the payment execution modules 252 to 254 by using the transaction information 300 and the payment method information 400 that are received from the payment method information extracting apparatus 101, and delivers payment information 500 containing the payment amount to the payment execution modules 252 to 254. The payment execution modules 252 to 254 execute the payment based on the payment information 500 received from the transaction amount assignment apparatus 102.

It should be noted that the transaction amount assignment apparatus 102 can be omitted, although the above-stated example shows a basic configuration of a system that incorporates the transaction amount assignment apparatus 102. However, if the transaction amount assignment apparatus 102 is not employed, the payment method information extracting apparatus 101 selects a payment execution module out of the payment execution modules 252 to 254 which deliver the transaction information 300 received, and delivers the transaction information 300 to the selected payment execution module. Then the payment execution module 252, 253 or 254 that has received the transaction information executes the payment by using the transaction information 300. Further, an example of a basic configuration of a system that incorporates three payment execution modules is shown here, but the number of the modules is not limited to three.

Figure 2:
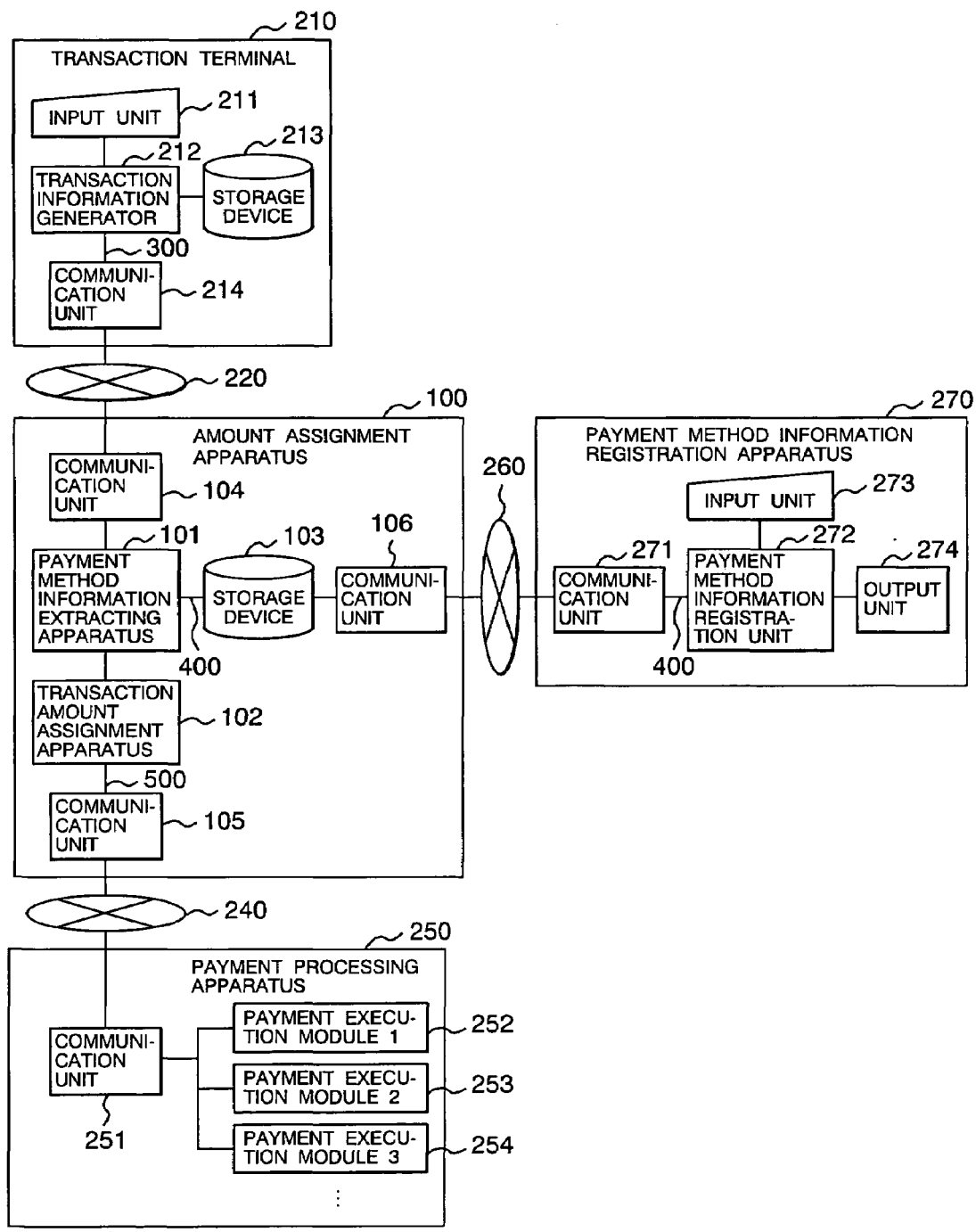
FIG. 2 is a diagram showing a system configuration according to an embodiment of the present invention.

An example of a system configuration implemented by the preferred embodiments of the present invention will then be described. FIG. 2 illustrates an example of a system configuration that is implemented by the embodiment of the present invention. The same configurations as those shown in FIG. 1 are denoted by the same reference numerals. As shown in FIG. 2, the example of a system implemented by the embodiment of the present invention comprises a transaction terminal 210, an amount assignment apparatus 100, a payment processing apparatus 250 and a payment method information registration apparatus 270.

The transaction terminal 210 is connected to the amount assignment apparatus 100 via a network 220 such as the Internet or an exclusive line. The payment processing apparatus 250 is connected to the amount assignment apparatus 100 via a network such as the Internet or an exclusive line. The payment method information registration apparatus 270 is connected to the amount assignment apparatus 100 via a network 260 such as the Internet or an exclusive line.

The transaction terminal may be, for example, a terminal unit called a POS (Point Of Sales), communication equipment called a cellphone, or a computer system called a PDA (Personal Digital Assistant), personal computer, or server. The amount assignment apparatus 100 can be a computer system called a personal computer or server, for example.

The payment processing apparatus 250 may be, for example, a computer system with which a customer manages an account opened with a banking facility; a computer system which is used to manage settlement by credit cards; a computer system or communication equipment that incorporates a storage device which can store electronic money, etc.; a combination of a storage medium, such as a magnetic card or an IC card which can store electronic money, and a computer system or communication equipment which incorporates a read/write device for the above-stated storage medium; a computer system to manage cash vouchers called gift vouchers or book coupons; a computer system to manage points; a computer system to manage local money; or a computer system to manage payments using loan.

The payment method information registration apparatus 270 may be, for example, communication equipment called cellphone, or a computer system called PDA, personal computer or server.

The transaction terminal 210 includes an input unit 211, a transaction information generator 212, a storage device 213, and a communication unit 214. The transaction information generator 212 is a program-operated information processor. When information notifying that a transaction is made is input from the input unit 211, the transaction information generator 212 generates the transaction information 300 containing a transaction amount by using information input from the input unit 211 and information to be stored on the storage device 213, and transmits the generated transaction information 300 to the amount assignment apparatus 100 via the communication unit 214.

The amount assignment apparatus 100 includes a communication unit 104, a payment method information extracting apparatus 101, a storage device 103, a communication unit 106, a transaction amount assignment apparatus 102, and a communication unit 105. The payment method information extracting device 101 and the transaction amount assignment apparatus 102 are program-operable information processors. The storage device 103 stores a plurality of payment method information 400. Upon receiving the transaction information 300 that is transmitted from the transaction terminal 210, the payment method information extracting apparatus 101 extracts the payment method information 400 from the storage device 103 based on the transaction information 300, and delivers the transaction information 300 and the payment method information 400 thus extracted to the transaction amount assignment apparatus 102. The transaction amount assignment apparatus 102, using the transaction information 300 and the payment method information 400 that are received from the transaction amount assignment apparatus 101, calculates payment amount of the payment execution modules 252 to 254, and transmits payment information 500 containing the payment amount to a payment processing apparatus 250.

The payment processing apparatus 250 includes a communication unit 251 and a plurality of payment execution modules 252 to 254. The payment execution modules 252, 253 and 254 execute payment based on the payment information 500 received from the amount assignment apparatus 100.

The payment method information registration apparatus 270 includes a communication unit 271, a payment method information registration unit 272, an input unit 273 and an output unit 274. The payment method information registration unit 272 is a program-operable information processor. In order to register the storage device 103 incorporated in the amount assignment apparatus 100 with the payment method information 400, the payment method information registration unit 272 generates the payment method information 400 by using information that is input from the input unit 273 and transmits the information to the storage device 103 incorporated in the amount assignment apparatus 100.

It should be noted that, in an example of the preferred embodiment, the networks 220, 240 and 260 are illustrated as networks different from one another. However, two out of the three networks 220, 240 and 260 may be of the same network, or all of such networks may be one and the same network.

Further, in the embodiment, an example in which the amount assignment apparatus 100 includes three communication units is shown. However, two out of the three communication units 104, 105 and 106 that are incorporated in the amount assignment apparatus 100 may be of the same communication unit, or all of such communication units may be one and the same unit.

Further, in the embodiment, an example in which the amount assignment apparatus 100 includes the transaction amount assignment apparatus 102 is shown, but the transaction amount assignment apparatus 102 may be omitted. However, if the transaction amount assignment apparatus 102 is not employed, it will be arranged that the payment method information extracting apparatus 101 selects a payment execution module out of the payment execution modules 252 to 254 and transmits the transaction information 300 to the selected payment execution module. Then the payment execution module that received the transaction information 300 executes the payment according to the payment method by using the transaction information 300.

Further, in the embodiment, an example in which the amount assignment apparatus 100 does not include any output unit is shown, but the amount assignment apparatus 100 may include an output unit to display the payment method information 400 that is extracted by the payment method information extracting apparatus 101 or the payment information 500 that is generated by the transaction amount assignment apparatus 102.

Further, in the embodiment, an example in which a single unit of the transaction terminal 210 is provided is shown, but a plurality of transaction terminals 210 may be connected to the amount assignment apparatus 100. In addition, in the embodiment, an example in which a single unit of the payment processing apparatus is provided is shown, but a plurality of transaction processing apparatuses 250 may be connected to the amount assignment apparatus 100.

Further, in the embodiment, an example in which the payment processing apparatus 250 includes three payment execution modules 252 to 254 is shown, but it is not limited thereto.

Further, in the embodiment, an example in which a single unit of the payment method information registration apparatus 270 is provided is shown, but a plurality of payment method information registration apparatuses 270 may be connected to the amount assignment apparatus 100, or otherwise, the payment method information registration apparatus may be omitted.

A structure of the transaction information 300 that is used in the preferred embodiment of the present invention will then be described. FIG. 3 shows a structural example of the transaction information that is used in the preferred embodiment of the present invention. As shown in FIG. 3, the transaction information 300 comprises a transaction amount 310, customer identification information 320, commodity identification information 330, shop identification information 340 and transaction attribute information 350. The transaction amount 310 is an amount that is paid by a customer for purchasing a commodity or a service. The customer identification information 320 is information to uniquely identify a customer who conducted a transaction, and more specifically, the information refers to an identifier such as an identification number or a name of a customer who conducted the transaction, for example. The commodity identification information 330 is information to uniquely identify the type of a commodity or a service transacted, and more specifically, the information refers to an identifier such as an identification number or a name of the type of a commodity or a service transacted, for example. The shop identification information 340 is information to uniquely identify a shop at which a transaction is conducted, and more specifically, the information refers to an identifier such as an identification number or a name of a shop at which the transaction is conducted, for example. The transaction attribute information 350 comprises information that is entered from the input unit 211 incorporated in the transaction terminal 210, or information that is stored on the storage device 213 incorporated in the transaction terminal 210.

According to the example illustrated in FIG. 3, in the transaction represented by the transaction information 300, the transaction amount 310 is "11000", the customer who conducted the transaction is "Customer A", the type of commodity transacted is "commodity type A", and the shop at which the transaction is conducted is "shop A."

It should be noted that, in an example of the embodiment, an example in which the transaction information 300 is expressed in a table format with one record is shown, but, for a case where a plurality of transactions are conducted in a lump, the information may be expressed in a table format with one or more records.

Further, an example where the transaction information 300 contains the commodity identification information 330 is shown, but, for a case where the commodity identification information 330 is not used for a process in the amount assignment apparatus 100, the shop identification information 340 may not be included in the transaction information 300.

Further, an example where the transaction information 300 contains the transaction attribute information 350 is shown, but, the transaction attribute information 350 may not be included in the transaction information 300.

Figure 4:
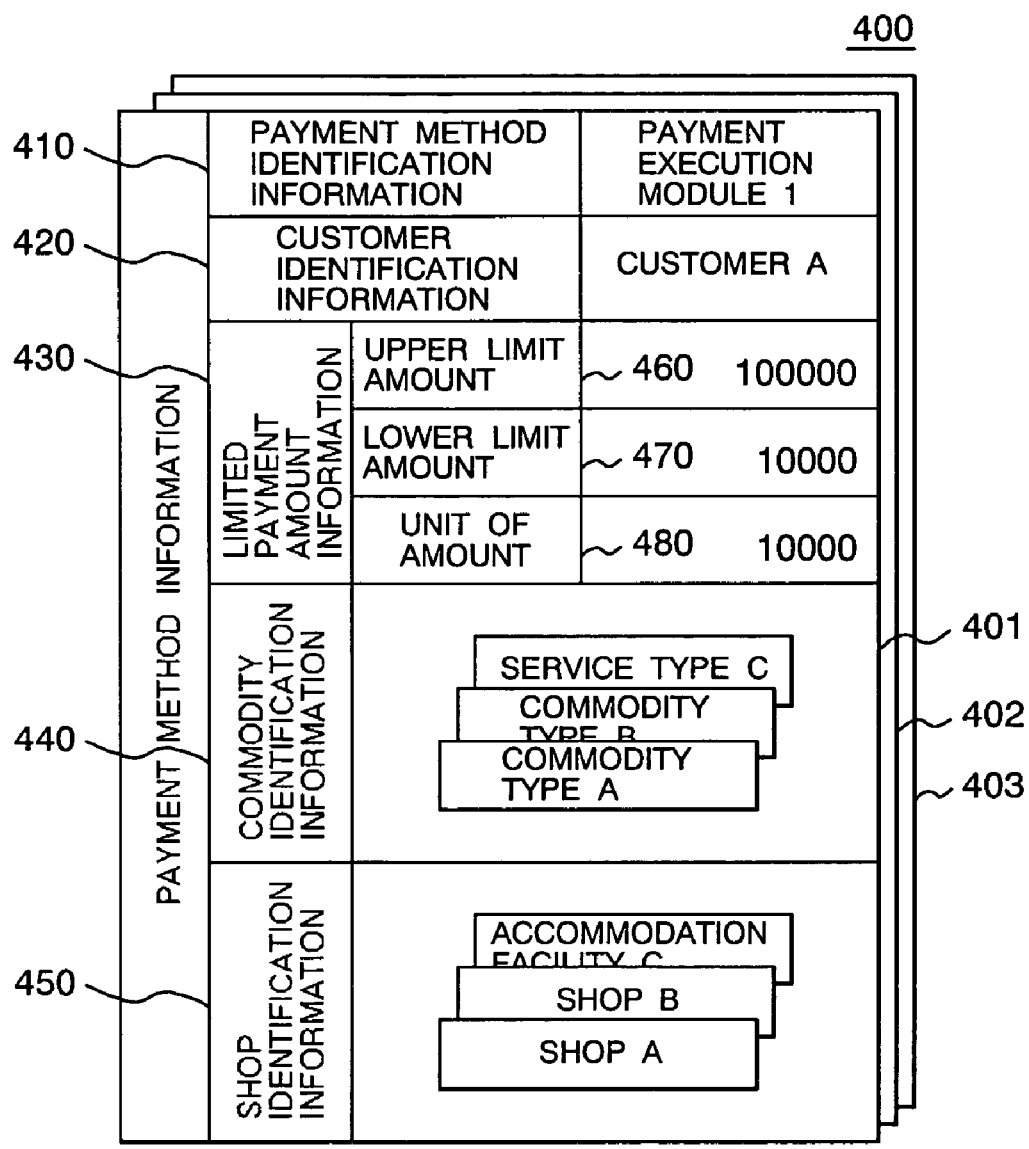
FIG. 4 is a diagram showing a structural example of a payment method according to the embodiment of the present invention.

Next, a structure of the payment method information 400 that is used in the preferred embodiment of the present invention will be described. FIG. 4 shows a structural example of the payment method information 400 that is used in the embodiment of the present invention. As shown in FIG. 4, the payment method information 400 comprises payment method identification information 410, customer identification information 420, limited payment amount information 430, commodity identification information 440 and shop identification information 450.

The payment method identification information 410 is information to uniquely identify a payment execution module (payment method) that is associated with the payment method information 400, and more specifically, the information refers to an identifier such as an identification number or a name of a payment execution module associated with the payment method information 400, for example. According to the example illustrated in FIG. 4, the payment execution module associated with the payment method information 401 is a "payment execution module 1" 252.

The customer identification information 420 is information to uniquely identify a customer who is eligible for a payment method associated with the payment method information 400, and more specifically, the information refers to an identifier such as an identification number or a name of a customer, for example. According to FIG. 4, the "Customer A" is eligible for a "payment execution module 1" 252.

The limited payment amount information 430 comprises an upper limit amount 460, a lower limit amount 470 and a unit of amount 480. The upper limit amount 460 shows the upper limit of amount that is payable with a payment method associated with the payment method information 400. The lower limit amount 470 shows the lower limit of amount that is payable with a payment method associated with the payment method information 400. The unit of amount 480 shows a unit of amount that is payable with a payment method associated with the payment method information 400. According to the example illustrated in FIG. 4, since the upper limit amount 460 of the "payment execution module 1" 252 is "100000", a payment for an amount of 200000 cannot be executed. In addition, since the lower limit amount 470 of the "payment execution module 1" 252 is "10000", a payment for an amount of 1000 cannot be executed. Further, since the unit of amount 480 of the "payment execution module 1" 252 is "10000", the payment for an amount of 15000 cannot be executed.

The commodity identification information 440 is information to identify the type of a commodity or a service that can be purchased with a payment method associated with the payment method information 400. More specifically, the information refers to an identifier such as an identification number or a name of the type of a commodity or a service that can be purchased with a payment method associated with the payment method information 400, for example. According to the example illustrated in FIG. 4, the "payment execution module 1" 252 is eligible for purchasing of "commodity type A", "commodity type B" and "service type C."

The shop identification information 450 is information to identify a shop or an accommodation facility where a payment method associated with the payment method information 400 is available. More specifically, the information refers to an identifier such as an identification number or a name of a shop or an accommodation facility where a payment method associated with the payment method information 400 is available, for example. According to the example illustrated in FIG. 4, the "payment execution module 1" 252 is eligible for use at "shop A", "shop B" and "accommodation facility C."

It should be noted that, in the embodiment, a case where the customer identification information 420 has only one customer identifier has been described, but, for a case where one payment method is available for a plurality of customers, etc., the customer identification information 420 may provided with a plurality of customer identifiers.

Further, in the embodiment, a case where the customer identification information 420 is incorporated in the payment method information 400 has been described, but, for a case where the payment processing apparatus 250 stores information to manage an available payment method for each customer, etc., the customer identification information 420 may not be incorporated in the payment method information 400.

Further, in the embodiment, a case where the limited payment amount information 430 is incorporated in the payment method information 400 has been described, but, for a case where the amount assignment apparatus 100 is not provided with the transaction amount assignment apparatus 102, etc., the limited payment amount information 430 may not be incorporated in the payment method information 400.

Further, in the embodiment, a case where the commodity identification information 440 is incorporated in the payment method information 400 has been described, but, for a case where the commodity identification information 440 is not used for a process executed in the amount assignment apparatus 100, etc., the commodity identification information 440 may not be incorporated in the payment method information 400.

Further, in the embodiment, a case where the shop identification information 450 is incorporated in the payment method information 400 has been described, but, for a case where the shop identification information 450 is not used for a process executed in the amount assignment apparatus 100, etc., the shop identification information 450 may not be incorporated in the payment method information 400.

Next, a structure of the payment information 500 that is used in the embodiment of the present invention will be described. FIG. 5 shows an example of a case where the payment information 500 is handled by way of a table format containing one record for each of the payment execution modules 252, 253 and 254. As shown in FIG. 5, the payment information 500 contains payment method identification information 510 and a payment amount 520. The payment method identification information 510 is information to uniquely identify a payment execution module, and more specifically, the information refers to an identifier such as an identification number or a name of a payment execution module. The payment amount 520 is an amount to be paid by a payment execution module associated with the payment method identification information 510. The example illustrated in FIG. 5 shows that the "payment execution module 1" 252 executes the payment of "10000", and the "payment execution module 3" 254 executes the payment of "1000."

Figure 6:
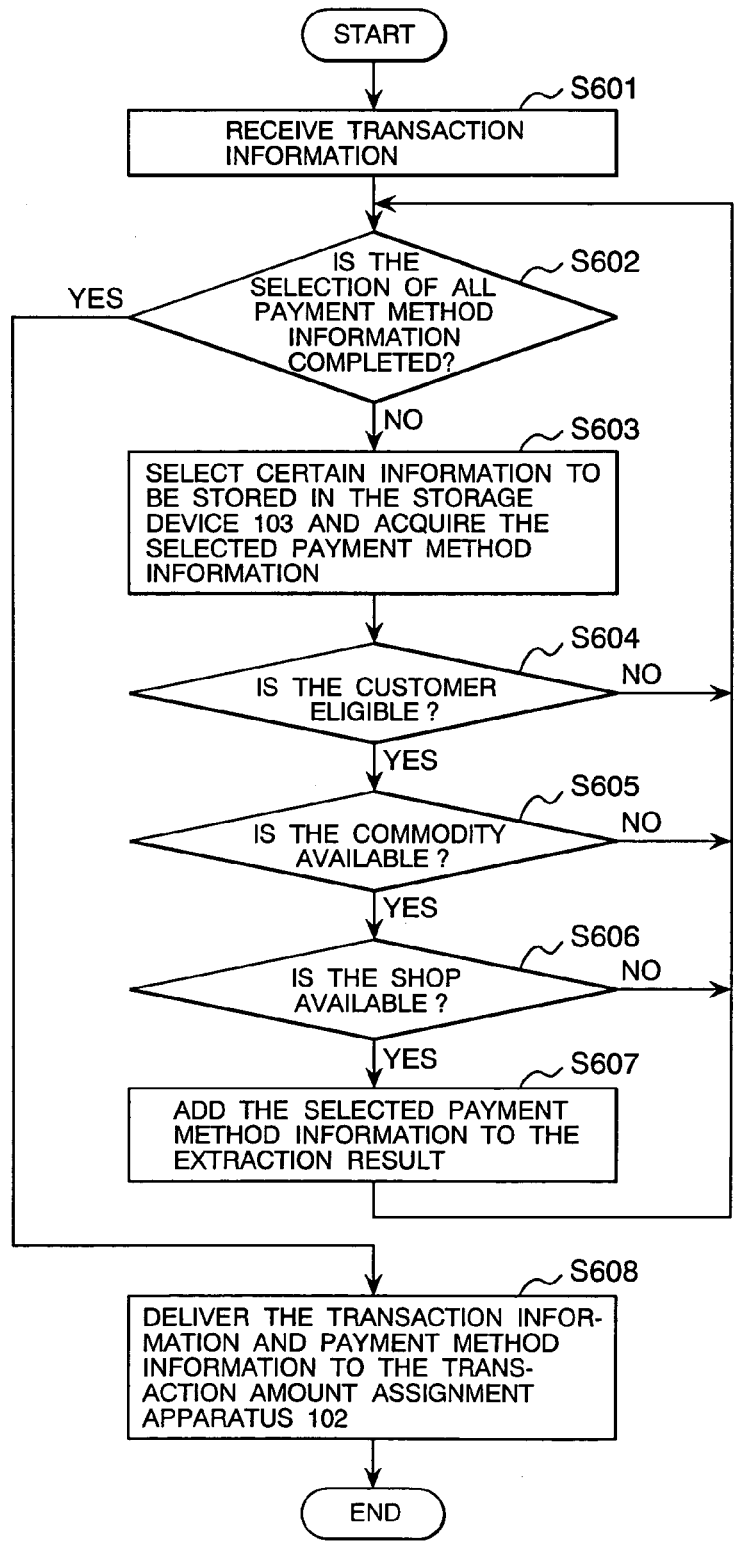
FIG. 6 is a flow chart showing an example of processing executed by a payment method information extracting apparatus according to the embodiment of the present invention.

Next, a process to be executed by the payment method information extracting apparatus 101 in the embodiment of the present invention will be described. FIG. 6 shows an example of a process that is executed by the payment method information extracting apparatus 101 in the embodiment of the present invention. In addition, FIG. 6 shows an example of a process to be executed by the payment method information extracting apparatus 101 after the transaction terminal 210 has transmitted the transaction information 300 to the amount assignment apparatus 100.

At Step S601, the transaction information 300 is received from the transaction terminal 210, and then, the procedure goes on to Step S602. At Step S602, a check is made as to whether or not all payment method information 400 that is stored in the storage device 103 has been selected at Step S603. If all payment method information 400 that is stored in the storage device 103 has been selected, the procedure goes on to Step S608. If all payment method information 400 that is stored in the storage device 103 has not been selected, then the procedure goes on to Step S603. At Step S603, a piece of payment method information 400 that has not been selected at Step S603 is selected from the payment method information 400 stored in the storage device 103, the payment method information thus selected is acquired, and then the procedure goes on to Step S604.

At Step S604, a check is made as to whether the customer identification information 320 of the transaction information 300 that is received at Step S601 and the customer identification information 420 of the payment method information acquired at Step S603 coincide with each other or not. If the customer identification information 320 of the transaction information 300 that is received at Step S601 and the customer identification information 420 of the payment method information acquired at Step S603 coincide with each other, then the procedure goes on to Step S605, and if not, the procedure returns to Step S602. In the examples of the transaction information 300 in FIG. 3 and the payment method information 401 in FIG. 4, for example, since both of the customer identification information 320 and the customer identification information 420 show "customer A", the procedure goes on to Step S605.

At Step 605, a check is made as to whether or not the commodity identification information 330 of the transaction information 300 received at Step S601 exists in the commodity identification information 440 of the payment method information 400 acquired in Step S603. If the commodity identification information 330 of the transaction information 300 received at Step S601 exists in the commodity identification information 440 of the payment method information 400 acquired at Step S603, then the procedure goes on to Step S606, and if not, the procedures returns to Step S602. In the examples of the transaction information 300 in FIG. 3 and the payment method information 401 in FIG. 4, since the "commodity type A" which is the commodity identification information 330 of the transaction information 300 exists in the commodity identification information 440 of the payment method information 401, the procedure goes on to Step S606.

At Step 606, a check is made as to whether or not the shop identification information 340 of the transaction information 300 received at Step S601 exists in the commodity identification information 450 of the payment method information 400 acquired in Step S603. If the shop identification information 340 of the transaction information 300 received at Step S601 exists in the shop identification information 440 of the payment method information 400 acquired at Step S603, then the procedure goes on to Step S607, and if not, the procedures returns to Step S602. For the case shown in the transaction information 300 in FIG. 3 and the payment method information 401 in FIG. 4, for example, since "shop A" which is the shop identification information 340 of the transaction information 300 exists in the shop identification information 450 of the payment method information 401, the procedure goes on to Step S607.

At Step S607, the payment method information 400 acquired at Step S603 is added to the extraction result, and the procedures returns to Step S602. At Step S608, the transaction information 300 received at Step S601 and all payment method information 400 that is added to the extraction result at Step S607 are delivered to the transaction amount assignment apparatus 102, and then the entire process is terminated.

It should be noted that, in the embodiment, a case where the payment method information 400 is extracted by using the commodity identification information 330 has been described. However, Step S605 may be omitted for a case where no restrictions on the type of commodities that are available for respective payment execution modules 252 to 254, for example.

It should be noted that, in the embodiment, a case where the payment method information 400 is extracted by using the shop identification information 340 has been described. However, Step S606 may be omitted for a case where shops that are available for respective payment execution modules 252 to 254 are not subject to any restrictions, for example.

In the embodiment of the present invention, for a case where the amount assignment apparatus 100 incorporates an output unit, a description will then be made of a screen on which the above-stated output unit displays the payment method information 400 extracted by the payment method information extracting apparatus 101. FIG. 7 shows an example of a screen to display the payment method information 400 that is extracted by the payment method information extracting device 101. A display screen 700 is an example of a display screen of the payment method information 400 extracted by the payment method information extracting apparatus 101. The display screen 700 displays a table 701 which lists identifiers 702 of an identification number, a name, etc. of the payment execution modules. According to the example shown in the display screen 700, the payment methods that are available for a transaction associated with the transaction information 300 which the amount assignment apparatus 100 received from the transaction terminal 210 include the "payment execution module 1" 252 and the "payment execution module 3" 254.

A display screen 710 is another example of a screen to display the payment method information 400 extracted by the payment method information extracting apparatus 101. The display screen 710 displays a table 711 comprising identifiers 712 such as an identification number and a name of payment execution modules, and flags 716 showing the availability of payment execution modules with a "○" mark for an available module and a "X" mark for an unavailable module. According to the example shown in the display screen 710, the "payment execution module 1" 252 has the "○" mark, the "payment execution module 2" 253 has the "X" mark, and the "payment execution module 3" 254 has the "○" mark. More specifically, according to the example shown in the display screen 710, the payment methods that is available for the transaction associated with the transaction information 300 which the amount assignment apparatus 100 received from the transaction terminal 210 include the "payment execution module 1" 252 and the "payment execution module 3" 254.

Figure 8:
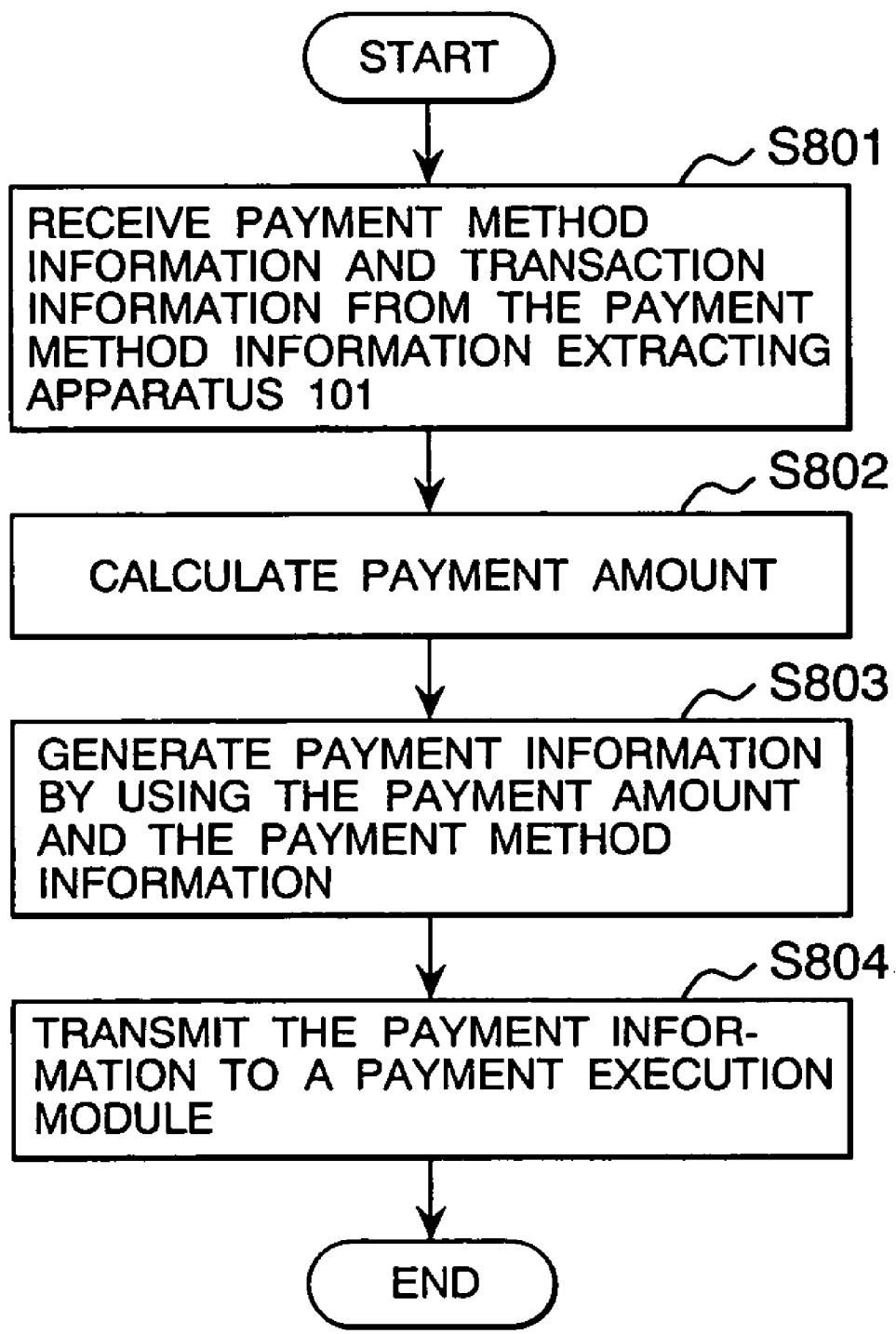
FIG. 8 is a diagram showing an example of processing executed by a transaction amount assignment apparatus according to the embodiment of the present invention.

A process executed by the transaction amount assignment apparatus 102 in the embodiment of the present invention will next be described. FIG. 8 shows an example of a process executed by the transaction amount assignment apparatus 102. In addition, FIG. 8 shows an example of a process executed by the transaction amount assignment apparatus 102 after the payment method information extracting apparatus 101 has delivered the transaction information 300 and the payment method information 400 to the transaction amount assignment apparatus 102.

At Step S801, the transaction information 300 and the payment method information 400 that were delivered by the payment method information extracting apparatus 101 are received, and the procedure goes on to Step S802. At Step S802, the payment amount is calculated by using the transaction information 300 and the payment method information 400 that were received at Step S801, and the procedure goes on to Step S803.

At Step S803, the payment information 500 containing the payment amount is created by using the payment method information 400 received at Step S801 and the payment amount calculated at Step S802, and the procedure goes on to Step S804.

At Step S804, the payment information 500 created at Step S803 is transmitted to the payment execution module 252, 253 or 254, of the payment processing apparatus 250, which associates with all payment method information 400 that was received at Step S801, and the entire process is terminated.

Figure 9:
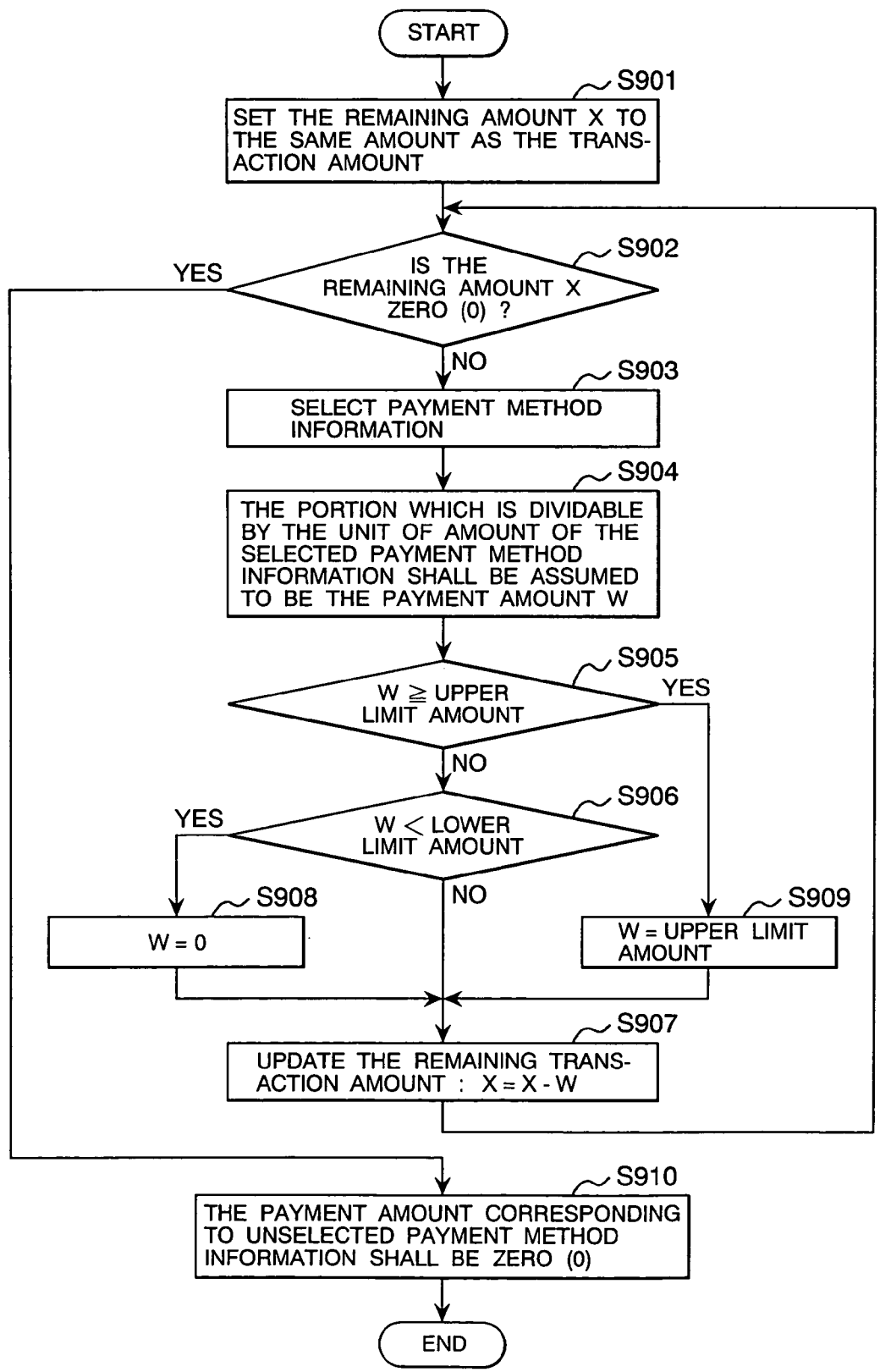
FIG. 9 is a flow chart showing an example of payment amount calculation processing according to the embodiment of the present invention.

FIG. 9 shows an example of the detailed payment amount calculation process that is executed by the transaction amount assignment apparatus 102 at Step S802 in the embodiment of the present invention. In the description to be made hereinafter, the remaining portion of the transaction amount that is assigned to the payment execution modules 252 to 254 shall be stated as X, and the transaction amount associated with the payment method information 400 that was selected in Step S903 shall be stated as W.

At Step S901, the remaining portion of the transaction amount X that is assigned to the payment execution modules 252 to 254 shall be set to the same amount as the transaction amount 310, and the procedure goes on to Step S902. According to the example shown in the transaction information 300 in FIG. 3, since the transaction amount 310 of the transaction information 300 is "11000", the amount X is set to 11000, and the procedure goes on to Step S902.

At Step S902, a check is made as to whether or not the amount X has reached zero. If the amount X is zero, then the procedure goes on to Step S910, and if not, then the procedure goes on to Step S903.

At Step 903, a piece of the payment method information that has not been selected in Step 903 is selected among the payment method information 400 that was received in Step S801.

At Step S904, the portion which is dividable by the unit of amount of the selected payment method information 400 shall be assumed to be the payment amount W, and the procedure goes on to Step S905. In the example shown in the payment method information 401 in FIG. 4, if the amount X is "11000", the payment amount W is set to "10000" since the unit of amount 480 of the payment method information 401 is "10000", and the procedures goes on to Step S905.

At Step S905, a check is made as to whether or not the payment amount W defined at Step S904 is equal to or more than the upper limit amount of the payment method information 400 selected at Step S903. If the payment amount W defined at Step S904 is equal to or more than the upper limit amount of the payment method information 400 selected at Step S903, then the procedure goes on to Step S909, and if is not, then the procedure goes on to Step S906. In the example shown in the payment method information 401 in FIG. 4, if the payment amount X defined at Step S904 is "10000", this means the payment amount W defined at Step S904 does not exceed "10000" which is the upper limit amount 460 of the payment method information 401, and the procedure goes on to Step S906.

At Step S906, a check is made as to whether the payment amount W defined at Step S904 is smaller than the lower limit amount of the payment method information selected at Step S903. If the payment amount W defined at Step S904 is smaller than the lower limit amount of the payment method information selected at Step S903, then the procedure goes on to Step S908, and if not, then the procedure goes on to Step S907. In the example shown in the payment method information 401, if the payment amount W defined at Step S904 is "10000", this means the payment amount W defined at Step S904 is not smaller than "10000" which is the lower limit amount 470 of the payment method information 400, and the procedure goes on to Step S907.

At Step 907, the value obtained by subtracting the payment amount W from the amount X is set to a new remaining amount X, and the procedure returns to Step S902. For example, if the payment amount W is "10000" and the remaining amount X is "11000", the remaining amount X is updated to "1000", and the procedure returns to Step S902.

At Step S908, the payment amount W defined at Step S904 is updated to zero, and the procedure returns to Step S907 before going on to Step S902 where the payment method information 400 that has not been selected yet at Step S903 is selected.

At Step S909, the payment amount W defined at Step S904 is changed to the same amount as the upper limit amount of the payment method information selected at Step S903, and the procedure goes on to Step S907.

At Step S910, the payment amount that is associated with all the payment method information 400 that have not been selected yet at Step S904 is set to zero, and the entire process is terminated.

Figure 10:
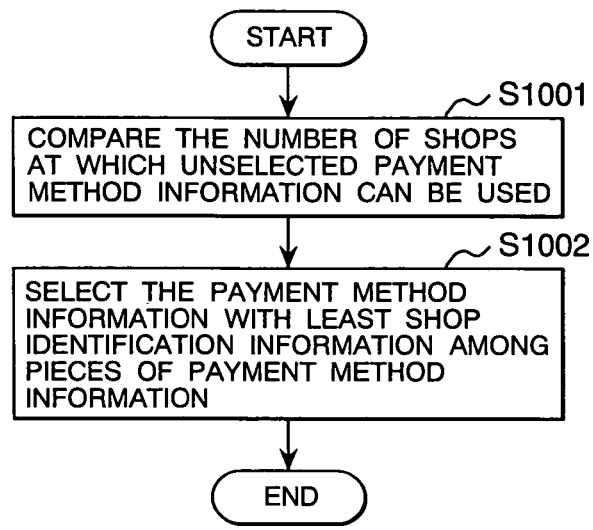
FIG. 10 is a flow chart showing an example of payment method information selection processing according to the embodiment of the present invention.

Referring to FIG. 10, an example of the detailed payment method information selection process executed at Step S903 will be described. FIG. 10 shows an example wherein the level of usage restrictions of respective payment method information 400 received at the above-stated Step S801 is compared to select the payment method information 400.

At Step S1001, a comparison is made as to the numbers of identifiers of shops or accommodation facilities contained in the shop identification information 450 of the payment information, and the procedure goes on to Step S1002. In this case, the payment information is the payment method information 400 that has been received at Step S903 and is the payment method information 400 that has not been selected yet at Step S1002.

At step S1002, payment method information having the least number of identifiers of shops or accommodation facilities that are contained in the shop identification information 450 is selected out of the payment method information 400 that are compared at Step S1001, and the entire process is terminated.

It should be noted that, in the embodiment, an example in which the payment information 500 created at Step S803 is transmitted to all the payment execution modules 252, 253 and 254 that are associated with the payment method information 400 received at Step S801 has been shown. However, the payment information 500 may not be transmitted to the payment execution module whose associated payment amount is zero.

Further, in the embodiment, a case where the lower limit amount 470 of the payment method information 400 is used for calculating the payment amount has been described, but Step S906 may be omitted where there is no restriction on the lower limit of the payment amount of respective payment execution modules 252 to 254.

Further, in the embodiment, a case where the number of identifiers of shops or accommodation facilities contained in the shop identification information 450 of the payment method information 400 is used to select the payment method information 400 in Steps S1001 and S1002 has been described, but the payment method information 400 may be selected by using the number of identifiers of types of commodities or services contained in the commodity identification information 440 of the payment method information 400.

Further, in the embodiment, a case where the number of identifiers of shops or accommodation facilities contained in the shop identification information 450 of the payment method information 400 is used to select the payment method information 400 in Steps S1001 and S1002 has been described. However, the payment method information 400 may be selected by using the sum of the number of identifiers of shops or accommodation facilities contained in the shop identification information 450 of the payment method information 400 and the number of identifiers of types of commodities or services contained in the commodity identification information 440 of the payment method information 400.

Furthermore, in the embodiment, a case where the number of identifiers of shops or accommodation facilities contained in the shop identification information 450 of the payment method information 400 is used to select the payment method information 400 in Steps S1001 and S1002 has been described. However, the payment method information 400 may be selected by using the limited payment amount information of the payment method information 400.

Figure 11:
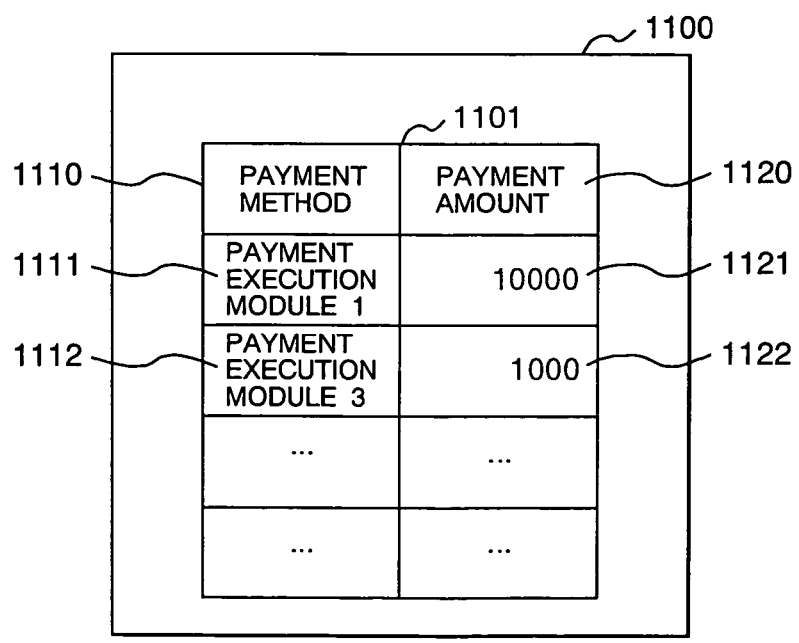
FIG. 11 is a diagram showing an example of a display screen of payment information according to the embodiment of the present invention.

In the present invention, for a case where the amount assignment apparatus 100 incorporates an output unit, a description will next be made of a screen on which the output unit displays the payment information 500 created by the transaction amount assignment apparatus 102. As shown in FIG. 11, the screen displays the payment information 500 that is created by the transaction amount assignment apparatus 102. As shown in FIG. 11, a display screen 1100 displays a table 1101 which comprises identifiers 1110 of identification numbers, names, etc. of payment execution modules and payment amounts 1120. According to the example shown in FIG. 11, the "payment execution module 1" 252 executes payment of "10000", while the "payment execution module 3" 254 executes payment of "1000."

Next, a process in which the payment method information registration apparatus 270 registers the storage device 103 with the payment method information 400 will be described. FIG. 12 shows a process executed by the payment method information registration unit 272 incorporated in the payment method information registration apparatus in the embodiment of the present invention.

At Step S1201, a payment method information entry screen is displayed on the output unit 274, and the procedure goes on to Step S1202. At Step S1202, the payment method information 400 is entered from the input unit 273, and upon completion of the entry, the procedure goes on to Step S1203. At Step S1203, the payment method information 400 that is entered at Step S1202 is transmitted to the storage device 103 to register the information on the storage device 103 incorporated in the amount assignment apparatus 100, and the entire process is terminated.

It should be noted that, in the embodiment, an example in which the payment method information 400 is directly entered and registered by using the input unit 273 has been described. However, the payment method information 400 may be generated by incorporating a storage device in the payment method information registration apparatus 270, and using the information stored on the storage device and the information entered by using the input unit 273, and the payment method information 400 thus generated may be transmitted to the storage device 103 incorporated in the amount assignment apparatus 100.

What is claimed is:

1. A payment apparatus that enables payment with a plurality of payment methods, comprising:
    an input unit which enters transaction information containing a transaction amount;
    a storage device which stores payment method information containing a usage restriction for each of said payment methods;
    a payment method information extracting apparatus which extracts payment method information from said storage device by using the transaction information received from said input unit, and selects a payment method that can be used for purchasing a commodity or for dealings with a shop based on said extracted payment method information; and
    a payment execution module which, by using said transaction information received from said payment method information extracting apparatus, executes payment according to said selected payment method; and
    wherein said payment methods include at least one of payment methods by a credit card, a debit card, installments, electronic money, a gift certificate, points, and a discount coupon.

2. A payment apparatus according to claim 1, further comprising a payment method information registration apparatus used for registering said storage device with said payment method information.

3. A payment apparatus according to claim 1, wherein:
    said transaction information contains shop identification information to identify a shop at which a transaction is executed;
    said payment method information contains shop identification information to identify a shop at which a transaction is possible with said payment method; and
    said payment method information extracting apparatus extracts payment method information associated with an available payment method by using the shop identification information of said transaction information from said storage device.

4. A payment apparatus according to claim 1, wherein:
    said transaction information contains commodity identification information to identify the type of commodity transacted;
    said payment method information contains commodity identification information to identify the type of commodity that can be transacted with said payment method; and
    said payment method information extracting apparatus extracts payment method information associated with a payment method which is made available by using the commodity identification information of said transaction information from said storage device.

5. A payment apparatus according to claim 1 further comprising:
    a transaction amount assignment apparatus which calculates a payment amount to be paid for each of said payment methods by using said payment method information and said transaction information received from said payment method information extracting apparatus, and generates payment information containing the payment amount thus calculated; and
    wherein said payment execution module executes a payment according to said payment method by using said payment information received from said transaction amount assignment apparatus.

6. A payment apparatus according to claim 5, wherein:
said payment method information contains payment amount restriction information concerning the restriction on the payment amount of said payment method; and
said transaction amount assignment apparatus calculates said payment amount by using the payment amount restriction information of said payment method information.

7. A payment apparatus according to claim 5, wherein:
said payment method information contains shop identification information to identify a shop that can be transacted with said payment method; and
said transaction amount assignment apparatus calculates said payment amount by using the shop identification information of said payment method information.

8. A payment apparatus according to claim 5; wherein:
said payment method information contains commodity identification information to identify the type of commodity that can be transacted with said payment method; and
said transaction amount assignment apparatus calculates said payment amount by using the commodity identification information of said payment method information.

9. A payment apparatus according to claim 1, wherein:
said payment execution module is stored in a payment processing apparatus connected with said payment method information extracting apparatus through a network;
as for one of the payment execution module, one of the payment method is executable.

10. A payment apparatus according to claim 1, wherein:
said payment method information extracting apparatus compares each of customer information, commodity information and shop information included in the transaction information and each of customer information, commodity information and shop information included in the payment method information, and selects the payment method which can be used.

11. A payment apparatus according to claim 1, further comprising a transaction amount assignment apparatus that assigns a remaining payment amount to a second payment method which can be used, when a payment amount cannot be divided into a unit of amount defined for a first payment method which can be used.

12. A payment apparatus according to claim 1, further comprising a transaction amount assignment apparatus that assigns a remaining payment amount to a second payment method which can be used, when a payment amount is more than an upper limit amount defined for a first payment method which can be used.

13. A payment apparatus according to claim 12, wherein:
said transaction amount assignment apparatus that assigns the remaining payment amount to a third payment method which can be used, when the remaining payment is smaller than a lower limit amount defined for the second payment method which can be used.

14. A payment processing method which enables a payment with a plurality of payment methods, comprising the steps of:
entering transaction information containing a transaction amount;
extracting payment method information containing information concerning a use restriction for each of said payment methods from a storage device by using said transaction information;
selecting a payment method that can be used for purchasing a commodity or for dealings with a shop based on said payment method information extracted; and
executing the payment, by using said transaction information, with said payment method selected; and
wherein said payment methods include at least one of payment methods by a credit card, a debit card, installments, electronic money, a gift certificate, points, and a discount coupon.

15. A payment processing method according to claim 14, further comprising the steps of:
calculating the payment amount to be paid for each of said payment methods by using said payment method information and said transaction information that are extracted;
generating payment information containing said payment amount calculated; and
wherein said executing the payment executes the payment according to said payment method by using said payment information.

16. An amount assignment apparatus, comprising:
a storage device which stores payment method information containing information concerning a use restriction for each payment method;
a payment method information extracting apparatus which enters transaction information containing a transaction amount and extracts payment method information from said storage device;
a payment information generation apparatus which calculates a payment amount to be paid with said payment method by using said transaction information and said payment method information that are transmitted from said payment method information extracting apparatus, and generates payment information containing said payment amount; and
wherein said payment method information extracting apparatus selects a payment method that can be used for purchasing a commodity or for dealings with a shop based on said payment method information;
said payment methods include at least one of payment methods by a credit card, a debit card, installments, electronic money, a gift certificate, points, and a discount coupon.

17. An amount assignment apparatus according to claim 16, wherein:
said payment method information extracting apparatus compares each of customer information, commodity information and shop information included in the transaction information and each of customer information, commodity information and shop information included in the payment method information, and selects the payment method which can be used.

18. An amount assignment apparatus according to claim 16, wherein:
said payment information generation apparatus assigns a remaining payment amount to a second payment method which can be used, when a payment amount cannot be divided in a unit of amount defined for a first payment method which can be used.

19. An amount assignment apparatus according to claim 16, wherein
said payment information generation apparatus assigns a remaining payment amount to a second payment method which can be used, when a payment amount is more than an upper limit amount defined for a first payment method which can be used.

20. An amount assignment apparatus according to claim 19, wherein:

said payment information generation apparatus assigns the remaining payment amount to a third payment method which can be used, when the remaining payment is smaller than a lower limit amount defined for the second payment method which can be used.

21. An amount assignment apparatus, comprising:

a storage device which stores payment method information containing information concerning a use restriction for each payment method;

an information processing apparatus which enters transaction information containing a transaction amount, extracts payment method information from said storage device, calculates the payment amount to be paid with said payment method by using said payment method information and said transaction information thus extracted, and generates payment information containing the payment amount thus calculated; and wherein said information processing apparatus selects a payment method that can be used for purchasing a commodity or for dealings with a shop based on said payment method information;

said payment methods include at least one of payment methods by a credit card, a debit card, installments, electronic money, a gift certificate, points, and a discount coupon.

22. An amount assignment apparatus according to claim 21, wherein information concerning a usage restriction for each of said payment methods is information concerning a restriction on payment amount.

23. An amount assignment apparatus according to claim 22, wherein information concerning the restriction on said payment amount refers to an upper limit amount, a lower limit amount and a unit of amount.

24. An amount assignment apparatus according to claim 22, wherein said payment method information further includes customer identification information.

25. An amount assignment apparatus according to claim 22, wherein said payment method information further includes shop identification information.

26. An amount assignment apparatus according to claim 22, wherein said payment method information further includes commodity identification information.

27. An amount assignment method, comprising the steps of:

entering transaction information containing a transaction amount;

extracting payment method information containing a usage restriction for each payment method from a storage device;

selecting a payment method that can be used for purchasing a commodity or for dealings with a shop based on said payment method information;

calculating a payment amount to be paid with said payment method by using said payment method information and said transaction information extracted;

generating payment information containing said payment amount calculated; and wherein said payment methods include at least one of payment methods by a credit card, a debit card, installments, electronic money, a gift certificate, points, and a discount coupon.

28. An amount assignment apparatus according to claim 27, wherein said payment information contains identification information of said payment method.

* * * * *